United States Patent
Iwaji et al.

(10) Patent No.: US 7,847,500 B2
(45) Date of Patent: Dec. 7, 2010

(54) SYNCHRONOUS MOTOR CONTROL DEVICE

(75) Inventors: Yoshitaka Iwaji, Hitachinaka (JP); Junnosuke Nakatsugawa, Hitachi (JP); Yasuhiko Kokami, Takasaki (JP); Minoru Kurosawa, Yoshii (JP)

(73) Assignee: Renesas Technology Corporation, Tokyo (JP)

( * ) Notice: Subject to any disclaimer, the term of this patent is extended or adjusted under 35 U.S.C. 154(b) by 334 days.

(21) Appl. No.: 12/001,799

(22) Filed: Dec. 12, 2007

(65) Prior Publication Data

US 2008/0143288 A1 Jun. 19, 2008

(30) Foreign Application Priority Data

Dec. 12, 2006 (JP) .............................. 2006-333906

(51) Int. Cl.
*H02P 7/00* (2006.01)

(52) U.S. Cl. .................... 318/432; 318/599; 318/811

(58) Field of Classification Search ................ 318/432, 318/599, 811, 799, 801, 700, 701, 632
See application file for complete search history.

(56) References Cited

U.S. PATENT DOCUMENTS 5,357,181 A * 10/1994 Mutoh et al. ................ 318/139
6,583,593 B2 * 6/2003 Iijima et al. ............ 318/400.32
7,088,063 B2 8/2006 Kurosawa et al.
2003/0057913 A1 * 3/2003 Matsushita et al. ........... 318/727
2006/0001392 A1 * 1/2006 Ajima et al. ................. 318/432
2006/0009893 A1 * 1/2006 Suzuki ........................ 701/41
2006/0158142 A1 7/2006 Kurosawa et al.

FOREIGN PATENT DOCUMENTS

| JP | 11103588 | 4/1999 |
| JP | 2001352789 | 12/2001 |
| JP | 2005102447 | 4/2005 |

* cited by examiner

*Primary Examiner*—Rina I Duda
(74) *Attorney, Agent, or Firm*—Townsend and Townsend and Crew LLP

(57) ABSTRACT

Control technique of a synchronous motor capable of suppressing rotation pulsation caused by individual difference without complicating control algorithm is provided. A pulsation generator superimposing a pulsation component anticipated in advance to a current command for the synchronous motor and a correction current generator superimposing a correction signal substantially having an average value of zero to the current command are provided in a synchronous motor control device. By this configuration, the correction signal suppressing a distortion component is superimposed to a value of the current command with a simplified control configuration. Torque pulsation is suppressed by determining the correction signal from difference between a detection current and a command current.

7 Claims, 17 Drawing Sheets

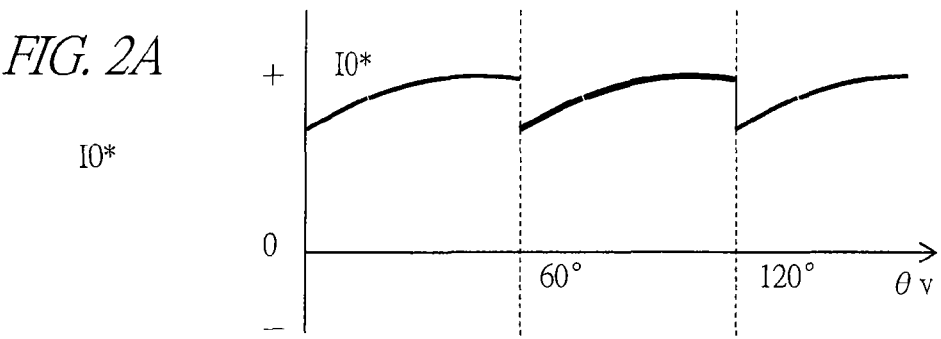
FIG. 2A  I0*
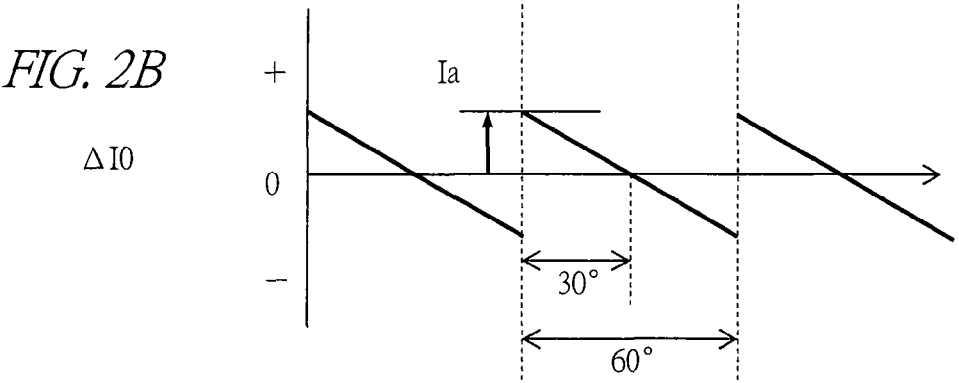
FIG. 2B  ΔI0
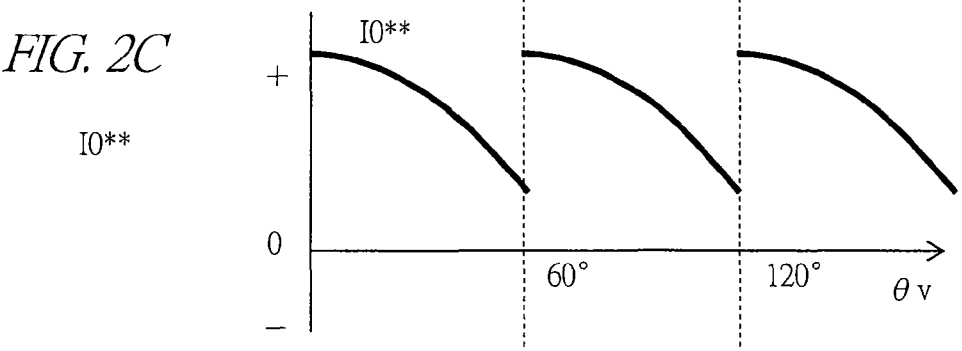
FIG. 2C  I0**
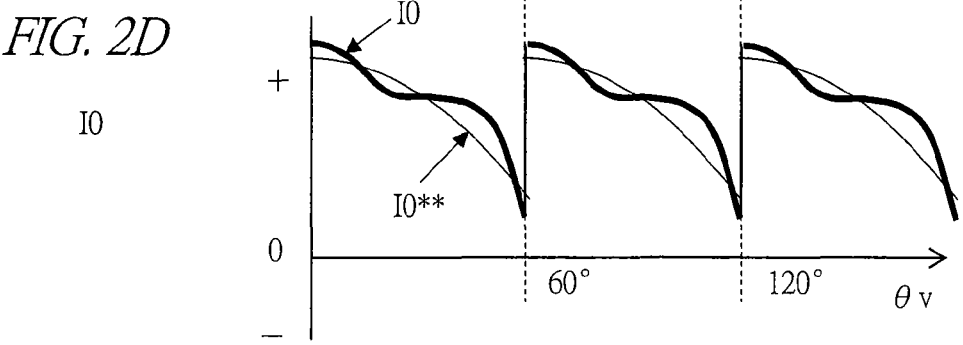
FIG. 2D  I0

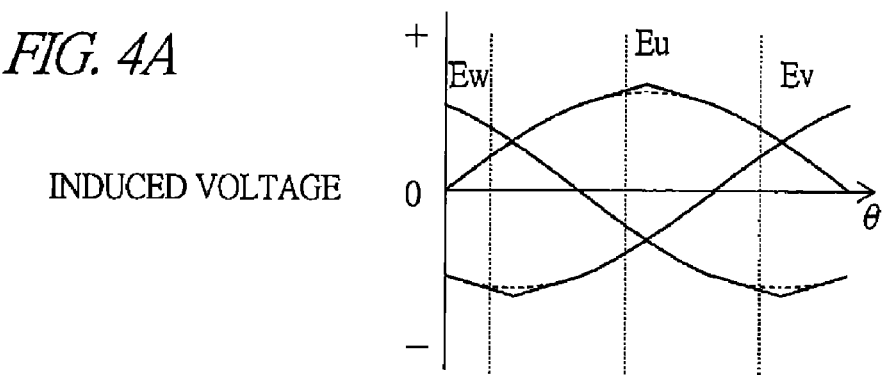
FIG. 4A  INDUCED VOLTAGE
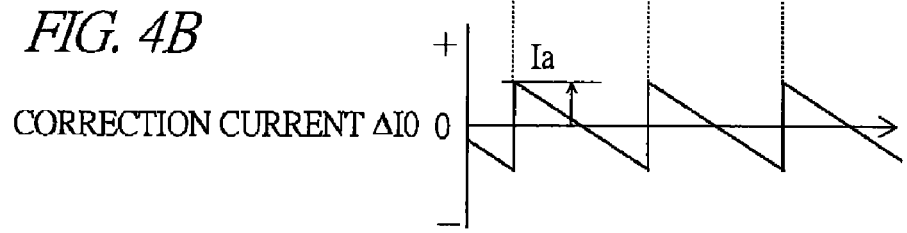
FIG. 4B  CORRECTION CURRENT ΔI0
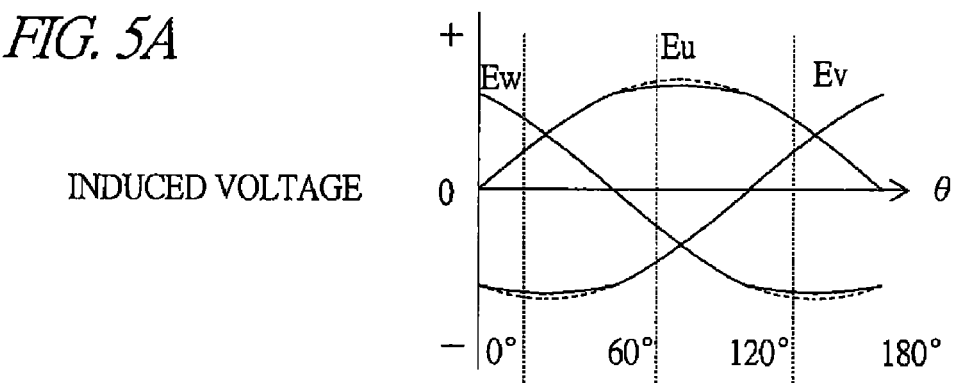
FIG. 5A  INDUCED VOLTAGE
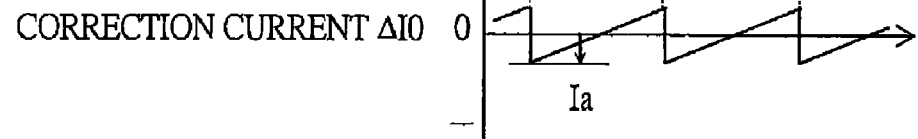
FIG. 5B  CORRECTION CURRENT ΔI0

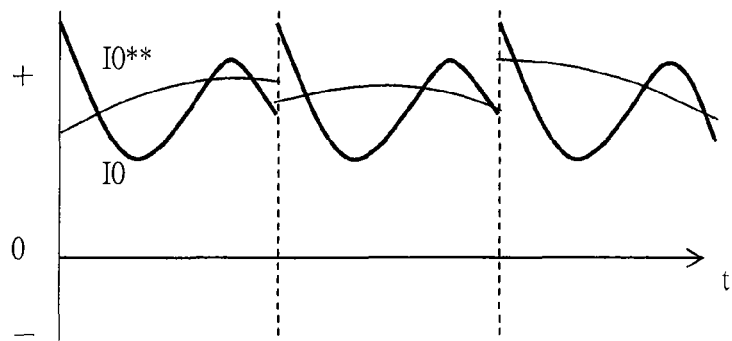
FIG. 8A
I0 AND I0**
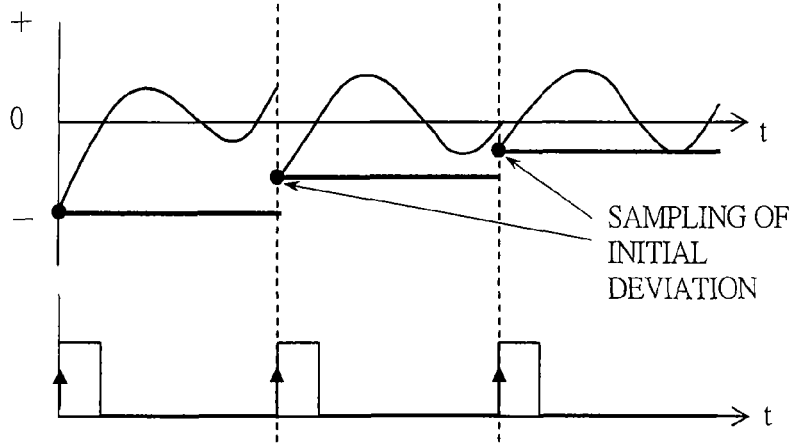
FIG. 8B
Ier
SAMPLING OF INITIAL DEVIATION
FIG. 8C
TRIGGER SIGNAL
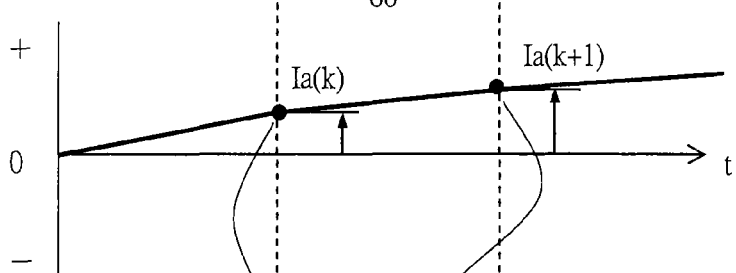
FIG. 8D
Ia
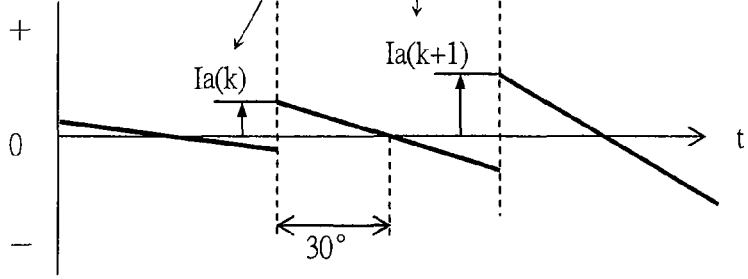
FIG. 8E
ΔI0

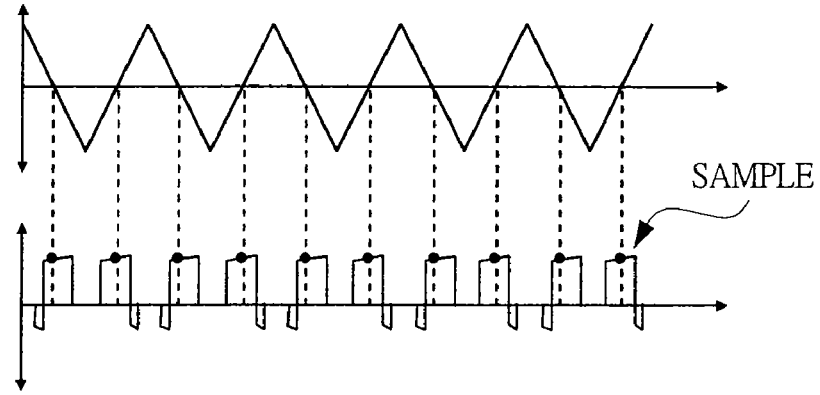
FIG. 19A TRIANGULAR WAVE CARRIER
FIG. 19B SHUNT CURRENT I0
SAMPLE
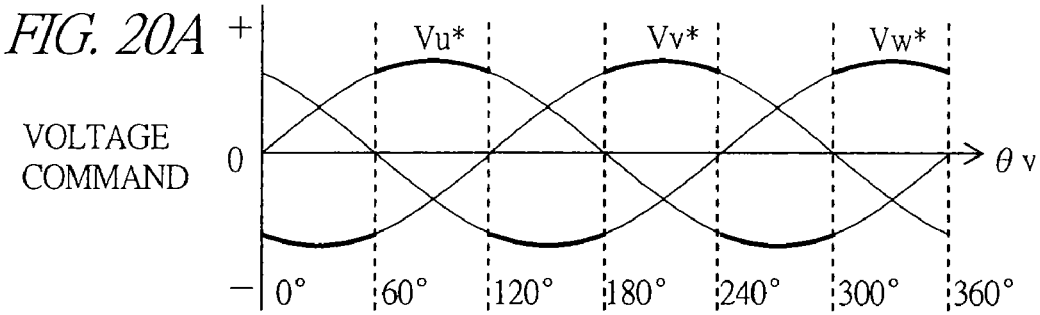
FIG. 20A VOLTAGE COMMAND
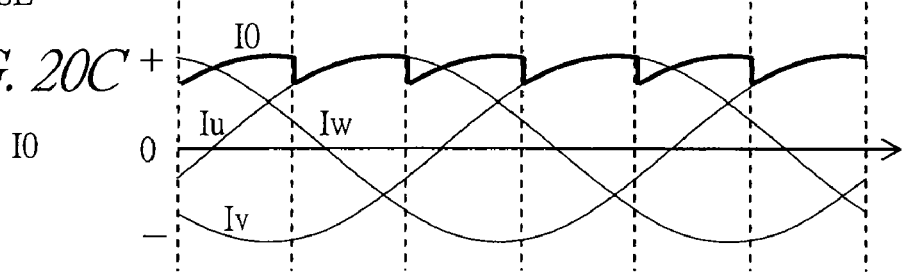
FIG. 20B DETECTION PHASE
FIG. 20C I0

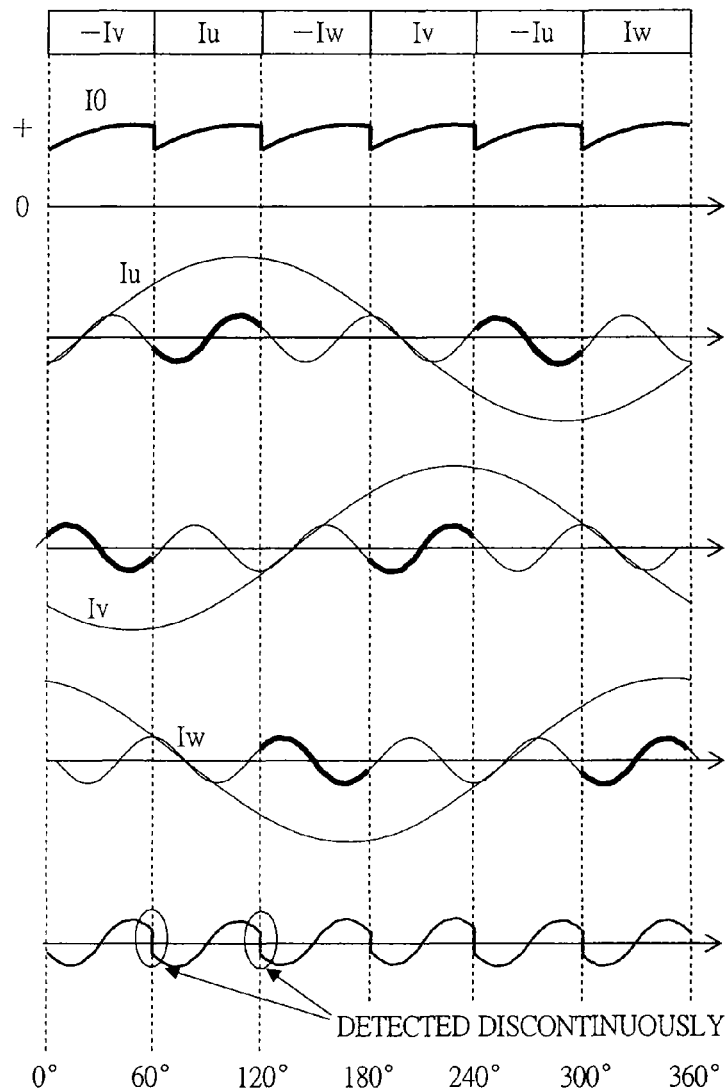
FIG. 21A DETECTION PHASE
FIG. 21B I0 (NO HARMONIC WAVE)
FIG. 21C U-PHASE CURRENT AND FIFTH-ORDER HARMONIC WAVE
FIG. 21D V-PHASE CURRENT AND FIFTH-ORDER HARMONIC WAVE
FIG. 21E W-PHASE CURRENT AND FIFTH-ORDER HARMONIC WAVE
FIG. 21F DETECTION VALUE OF FIFTH-ORDER HARMONIC WAVE
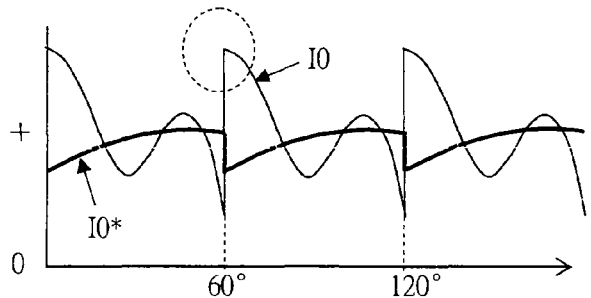
FIG. 22

SYNCHRONOUS MOTOR CONTROL DEVICE

CROSS-REFERENCE TO RELATED APPLICATION

The present application claims priority from Japanese Patent Application No. JP 2006-333906 filed on Dec. 12, 2006, the content of which is hereby incorporated by reference into this application.

TECHNICAL FIELD OF THE INVENTION

The present invention relates to control technique of a synchronous motor, in particular, to technique applied effectively to rotation control technique of a spindle motor, such as a hard disk driver (HDD), an optical disk driver and the like, in a motor driving device and a motor driving integrated circuit device.

BACKGROUND OF THE INVENTION

For example, in a driving method of a spindle motor of a HDD device, reduction in rotation pulsation is desired strongly. If the rotation pulsation is large, it causes an error in reading or writing, and it is a great obstacle to increase recording density. Furthermore, the rotation pulsation is preferably small as possible to reduce noise generated by the HDD device.

And, in recent years, with advancement in reduction in cost of the HDD, reduction in manufacturing cost of the spindle driving motor is required. Consequently, degradation in manufacturing precision and manufacturing variation are increased, and torque pulsation caused therefrom is becoming a problem.

In such a situation, a method using an ideal sinusoidal current as a driving current waveform of the motor is the mainstream in recent years (Japanese Patent Application Laid-Open Publication No. 2005-102447 (Patent Document 1), for example). If an induced voltage of the motor is assumed to be an ideal sinusoidal wave, the rotation pulsation can be suppressed to zero by driving the motor with a sinusoidal current, in principle.

In reality, however, the induced voltage of the motor is distorted and a pulsation component is generated even in the sinusoidal wave driving. In order to suppress this, in Patent Document 1, the waveform of the applied voltage is corrected so as to be adjusted to match the induced voltage in advance, thereby suppressing generation of the pulsation.

In addition, as a driving method for suppressing the rotation pulsation, a method of tabling a pulsation pattern in advance and correcting the pulsation (Japanese Patent Application Laid-Open Publication No. 11-103588 (Patent Document 2), for example), a method of calculating and estimating a disturbance torque component, which is a cause of pulsation, by an observer and performing control to cancel the disturbance torque component (Japanese Patent Application Laid-Open Publication No. 2001-352789 (Patent Document 3)) and the like are proposed.

SUMMARY OF THE INVENTION

In the driving methods described above, the pulsation component can be made zero, in principle, by making the driving waveform of the motor a sinusoidal waveform. In reality, however, the pulsation component is sometimes generated by property of the motor itself.

A first factor thereof is caused when an induced voltage generated inside the motor is distorted. This includes a case caused by a stator or a rotor configuration of the motor and a case caused by a winding manner (distributed winding/concentrated winding) of a coil. In such cases, even if a sinusoidal voltage is applied, distortion components are generated, and therefore, rotation pulsation occurs. The pulsation component in these cases often generates a sixth-order frequency component with respect to a driving frequency.

A second factor thereof is caused by manufacturing variation. As manufacturing cost of the motor lowers, manufacturing accuracy thereof is deteriorated, as a result, variation between phases and the like occur. If variation occurs among three-phase windings, a pulsation component of a second-order harmonic wave is generated and large rotation pulsation occurs.

In order to suppress the second-order or sixth-order pulsation component, in Patent Document 1, the waveform of the driving voltage is intentionally deformed to suppress the component. In Patent Document 2, the pulsation component is stored in advance and by flowing a current so as to cancel such pulsation, the rotation pulsation is suppressed. In each case, it is required to research what kind of distortion will be generated, in advance. In these methods, it is difficult to respond to individual difference of a motor in a case where the driver is realized with a dedicated integrated circuit. A learning function may be provided to the driver itself, but in this case, size of the integrated circuit increases greatly, and at the same time, a complex control processing must be mounted.

And, as described in Patent Document 3, the individual difference of a motor can be responded by the method of observing disturbance torque by an observer and suppressing the same. However, the method also requires complex control algorithm and size of an integrated circuit increases greatly.

In view of such problems, an object of the present invention is to provide control technique of a synchronous motor capable of suppressing rotation pulsation caused by individual difference of a motor without complicating control algorithm.

The above and other objects and novel characteristics of the present invention will be apparent from the description of this specification and the accompanying drawings.

The typical ones of the inventions disclosed in this application will be briefly described as follows.

The present invention has a feature that a means of superimposing a pulsation component anticipated in advance to a current command for a synchronous motor and a means of superimposing a correction signal substantially having an average value of 0 to the current command are provided in a synchronous motor control device. That is, in order to simplify a control configuration, a method disclosed in Patent Document 1 is employed as a basic configuration and then the correction signal for suppressing a distortion component is superimposed to a current command value. By determining the correction signal from difference between a detection current and a command current, torque pulsation is suppressed.

Specifically, current in DC side of an inverter driving the synchronous motor is detected, a pulsation component anticipated to be included in the detection value is superimposed to the current command in advance, and at the same time, another correction current having a saw-tooth wave pattern for suppressing current distortion generated by induced voltage distortion of the synchronous motor is applied. By adjusting magnitude thereof, driving current is made a smooth sinusoidal current, and therefore, the torque pulsation is suppressed.

The effects obtained by typical aspects of the present invention will be briefly described below.

According to the present invention, the torque pulsation caused by the induced voltage distortion of the motor can be suppressed automatically without complicating a control configuration. Waveform information (phase, amplitude and the like) of the pulsation component does not need to be obtained in advance as in the conventional art, and individual difference of a motor can also be responded. Furthermore, the method itself is simple and is very effective when realizing the method with a dedicated IC.

BRIEF DESCRIPTIONS OF THE DRAWINGS

FIG. 2A is a diagram showing an example of operation waveforms of a current command and a correction current in the motor drive system according to the first embodiment of the synchronous motor control device of the present invention;

FIG. 2B is a diagram showing an example of operation waveforms of the current command and the correction current in the motor drive system according to the first embodiment of the synchronous motor control device of the present invention;

FIG. 2C is a diagram showing an example of operation waveforms of the current command and the correction current in the motor drive system according to the first embodiment of the synchronous motor control device of the present invention;

FIG. 2D is a diagram showing an example of operation waveforms of the current command and the correction current in the motor drive system according to the first embodiment of the synchronous motor control device of the present invention;

FIG. 4A is a diagram showing an example 1 of an induced voltage and a correction current in a motor drive system according to a third embodiment of the synchronous motor control device of the present invention;

FIG. 4B is a diagram showing the example 1 of the induced voltage and the correction current in the motor drive system according to the third embodiment of the synchronous motor control device of the present invention;

FIG. 5A is a diagram showing an example 2 of the induced voltage and the correction current in the motor drive system according to the third embodiment of the synchronous motor control device of the present invention;

FIG. 5B is a diagram showing the example 2 of the induced voltage and the correction current in the motor drive system according to the third embodiment of the synchronous motor control device of the present invention;

FIG. 8A is a diagram showing operation waveforms of a correction current in the motor drive system according to the third embodiment of the synchronous motor control device of the present invention;

FIG. 8B is a diagram showing operation waveforms of the correction current in the motor drive system according to the third embodiment of the synchronous motor control device of the present invention;

FIG. 8C is a diagram showing an operation waveform of the correction current in the motor drive system according to the third embodiment of the synchronous motor control device of the present invention;

FIG. 8D is a diagram showing operation waveforms of the correction current in the motor drive system according to the third embodiment of the synchronous motor control device of the present invention;

FIG. 8E is a diagram showing operation waveforms of the correction current in the motor drive system according to the third embodiment of the synchronous motor control device of the present invention;

FIG. 19A is a diagram showing relation between a triangular wave carrier and current sampling in the motor drive system according to the comparative technique (Patent Document 1) with respect to the present invention;

FIG. 19B is a diagram showing the relation between the triangular wave carrier and the current sampling in the motor drive system according to the comparative technique (Patent Document 1) with respect to the present invention;

FIG. 20A is a diagram showing relation between a voltage phase and a detection current in the motor drive system according to the comparative technique (Patent Document 1) with respect to the present invention;

FIG. 20B is a diagram showing the relation between the voltage phase and the detection current in the motor drive system according to the comparative technique (Patent Document 1) with respect to the present invention;

FIG. 20C is a diagram showing the relation between the voltage phase and the detection current in the motor drive system according to the comparative technique (Patent Document 1) with respect to the present invention;

FIG. 21A is a diagram showing an example of discontinuity in a detected fifth harmonic wave in the motor drive system according to the comparative technique (Patent Document 1) with respect to the present invention;

FIG. 21B is a diagram showing an example of discontinuity in the detected fifth harmonic wave in the motor drive system according to the comparative technique (Patent Document 1) with respect to the present invention;

FIG. 21C is a diagram showing an example of discontinuity in the detected fifth harmonic wave in the motor drive system according to the comparative technique (Patent Document 1) with respect to the present invention;

FIG. 21D is a diagram showing an example of discontinuity in the detected fifth harmonic wave in the motor drive system according to the comparative technique (Patent Document 1) with respect to the present invention;

FIG. 21E is a diagram showing an example of discontinuity in the detected fifth harmonic wave in the motor drive system according to the comparative technique (Patent Document 1) with respect to the present invention;

FIG. 21F is a diagram showing an example of discontinuity in the detected fifth harmonic wave in the motor drive system according to the comparative technique (Patent Document 1) with respect to the present invention; and FIG. 22 is a diagram showing an example of waveforms of a current command and a detection current in the motor drive system according to the comparative technique (Patent Document 1) with respect to the present invention.

DESCRIPTIONS OF THE PREFERRED EMBODIMENTS

Hereinafter, embodiments of the present invention will be described in detail with reference to the accompanying drawings. Note that the same components are denoted by the same reference symbols throughout the drawings for describing the embodiment, and the repetitive description thereof will be omitted.

The present prevention is applied to a synchronous motor control device comprising: a synchronous motor; an inverter applying a pulse-width-modulation voltage to the synchronous motor and driving the synchronous motor with a sinusoidal alternating current; a direct current power source supplying power to the inverter; a single-shunt current detector detecting a current supplied to the inverter, an I* generator generating a current command for the synchronous motor; and a controller adjusting a voltage outputted by the inverter based on a current detection value from the single-shunt current detector and the current command from the I* generator. Each embodiment is described specifically below. Note that, in each embodiment, the synchronous motor is sometimes referred to as a motor, simply. And, a case in which the single-shunt current detector is included in the inverter is described. Furthermore, "*" in each diagram denotes a command.

First Embodiment

Figure 1:
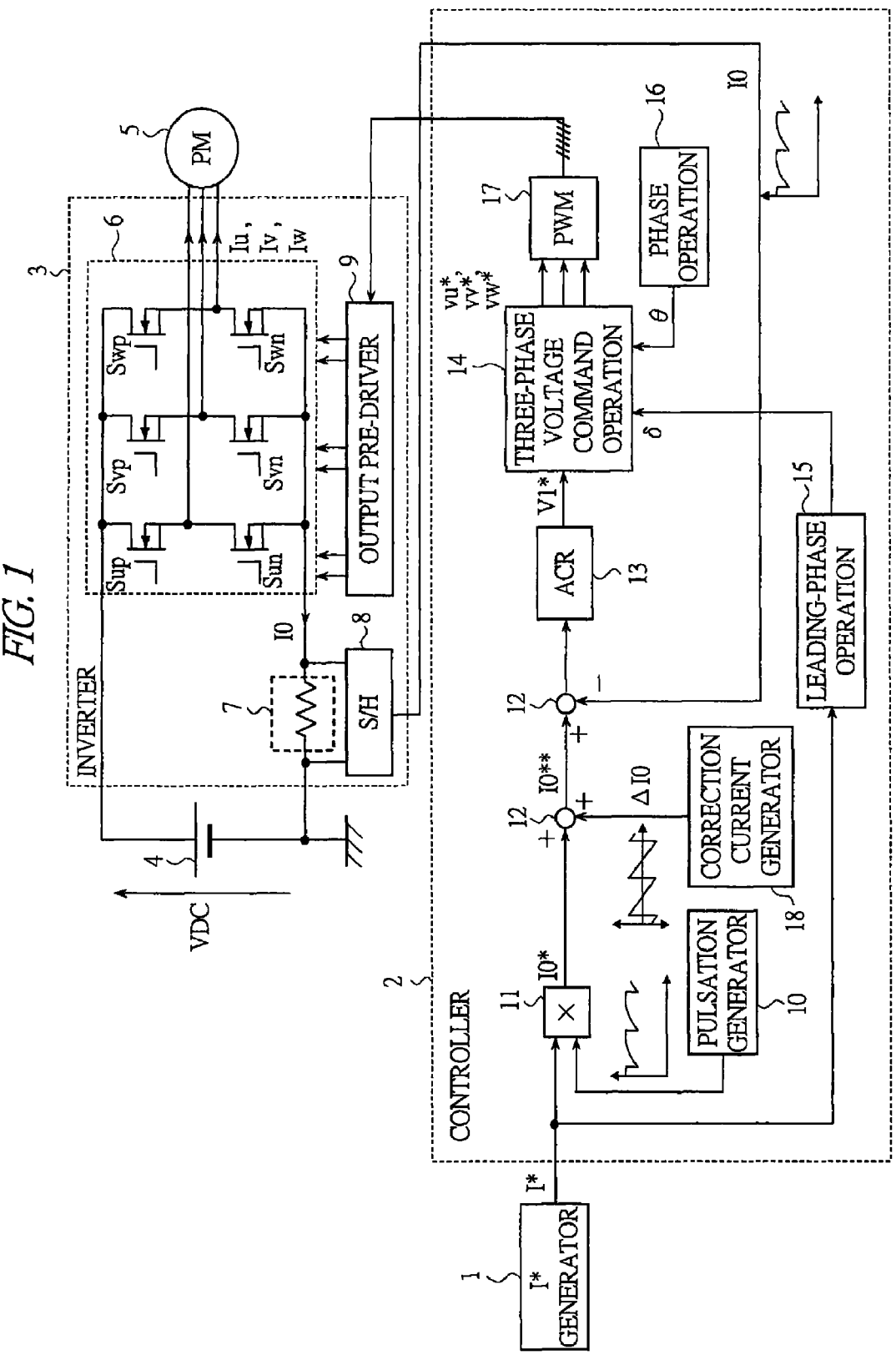
FIG. 1 is a diagram showing a configuration of a motor drive system according to a first embodiment of a synchronous motor control device of the present invention.

A motor drive system according to a first embodiment of the synchronous motor control device of the present invention is described using FIGS. 1 to 2D.

FIG. 1 shows a configuration of the motor drive system according to the present embodiment. The motor drive system shown in FIG. 1 is composed of an I* generator 1 generating a current command corresponding to torque of the synchronous motor, a controller 2 calculating an application voltage for the synchronous motor and generating a pulse width modulation wave (PWM) signal for an inverter 3, the inverter 3 receiving the PWM signal from the controller 2 and generating an alternating current voltage from a direct current voltage, a direct current power source 4 which is a power source for the inverter 3, and a synchronous motor 5 controlled by these components.

And, the inverter 3 is composed of an inverter main circuit unit 6 including six switching elements Sup, Sun, Svp, Svn, Swp and Swn, a single-shunt current detector 7 detecting a supply current I0 for the inverter main circuit unit 6, a sample-holder 8 sampling and holding a voltage between both ends of the single-shunt current detector 7 and an output pre-driver 9 directly driving the inverter main circuit unit 6.

The I* generator 1 is a controller positioning at a higher order of the controller 2 and generating the current command I* corresponding to a torque current of the synchronous motor. The controller 2 operates so that the synchronous motor 5 generates torque corresponding to the command I*.

The controller 2 includes: a pulsation generator 10 generating a pulsation component anticipated in advance with respect to an output (a single-shunt current detection value) of the sample-holder 8; a multiplier 11 multiplying the current command I* and a signal from the pulsation generator 10 to calculate a new current command I0*; an adder-subtractor 12 adding (+) or subtracting (−) signals; an ACR (a current controller) 13 calculating an application voltage amplitude command V1* for the synchronous motor 5 based on the current command I0** and the deviation of the current detection value I0; a three-phase voltage command operator 14 computing three-phase AC voltage commands Vu*, Vv*, and Vw* based on the V1*, a phase angle θ and a leading-phase angle d; a leading-phase angle operator 15 operating the leading-phase angle d of a voltage phase from the current command I*; a phase operator 16 calculating (or detecting) an induced-voltage phase θ of the synchronous motor 5; a PWM generator 17 generating a pulse width modulation signal based on the three-phase AC voltage commands Vu*, Vv* and Vw*; and a correction current generator 18, which is a characteristic portion of the present invention.

Particularly, in the present embodiment, the pulsation generator 10 functions as a means of superimposing the pulsation component anticipated in advance to the current command and the correction current generator 18 functions as a means of superimposing a correction signal substantially having an average value of 0 to the current command.

Basic operation of the motor drive system of the present embodiment is described below.

Figure 15:
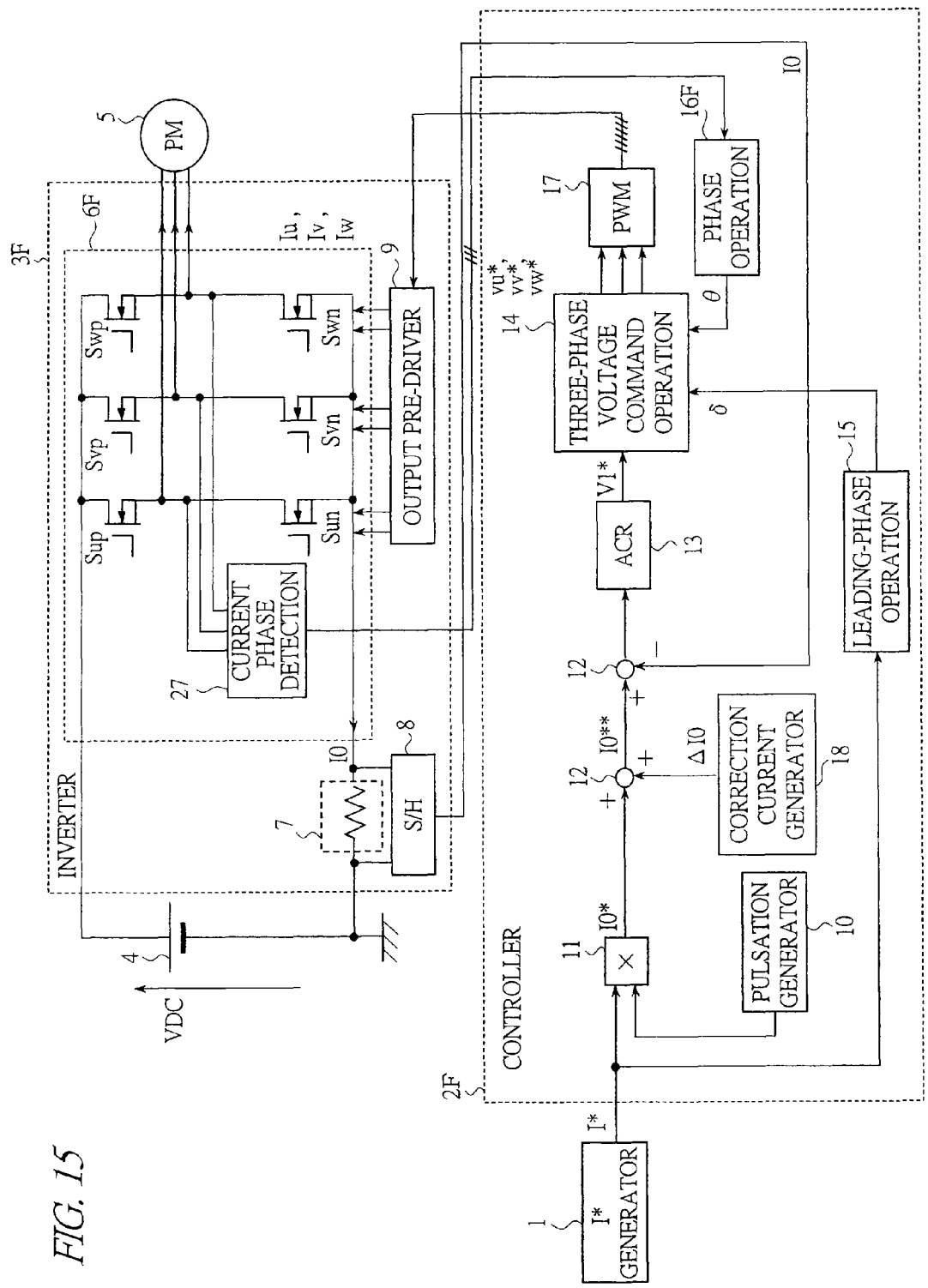
FIG. 15 is a diagram showing a configuration of a motor drive system according to a sixth embodiment of the synchronous motor control device of the present invention.

The basic operation of the motor drive system of the present embodiment is based on FIG. 15 described in Patent Document 1. The outline and the problem thereof are described using FIGS. 18 to 22 for the sake of convenience of explaining the basic operation of the motor drive system of the present embodiment.

Figure 18:
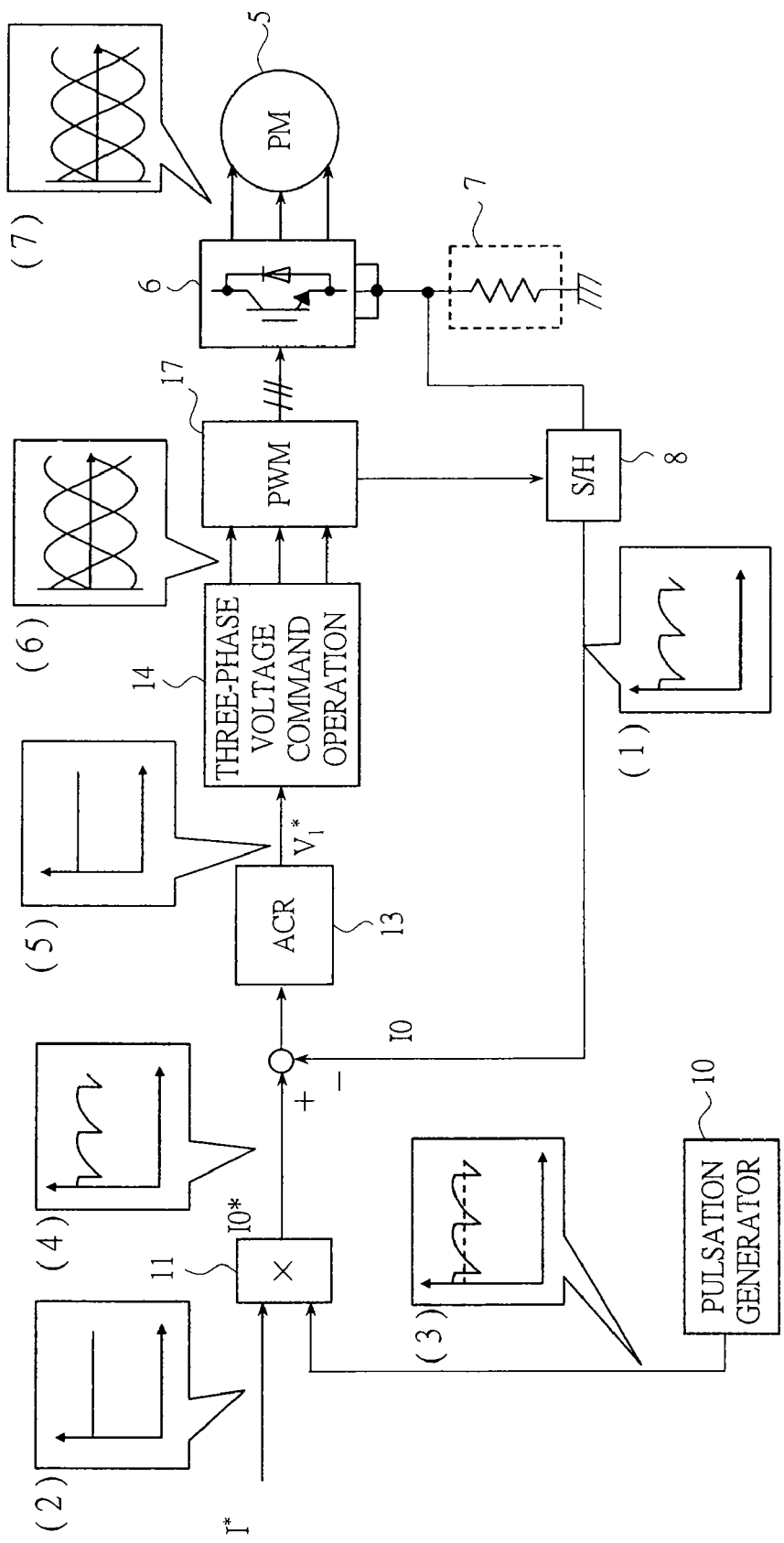
FIG. 18 is a diagram showing a configuration of a motor drive system according to comparative technique (Patent Document 1) with respect to the present invention.

FIG. 18 conceptually shows the motor drive system disclosed in Patent Document 1 using components of FIG. 1.

Components in FIG. 18 are all the same with those in FIG. 1, and description about a portion not related to the basic operation is omitted.

By detecting a current of the single-shunt current detector 7 by the sample-holder 8, a detection waveform as shown in (1) of FIG. 18 is obtained. A principle of obtaining such waveform is shown in FIGS. 19A to 20C. FIGS. 19A and 19B show relation between a triangular wave carrier used inside the PWM generator 17 and the single-shunt current. The single-shunt current has a waveform in which a part of three-phase AC currents (sinusoidal waves) appears intermittently. Here, a sampling timing of the sample-holder 8 is defined as a zero-crossing point of the triangular wave carrier as shown in FIGS. 19A and 19B. As a result, a detection current is a current of a phase outputting a voltage having the largest absolute value among the three-phase AC voltage commands.

That is, as shown in FIGS. 20A to 20C, in a period of time in which a phase θv of the voltage command is 0 to 60 degrees, a current Iv of V-phase is detected, and in a period of time in which the phase θv is 60 to 120 degrees, a current Iu of U-phase is detected. As a result, a current waveform read into the controller has a detection phase switched every 60 degrees, and has a waveform shown in I0 of FIG. 20C. This waveform is a waveform obtained when the motor 5 is driven by a sinusoidal current. And therefore, in order to perform current control, it is necessary to anticipate that a current of such shape will detected and to provide the pulsation component to the current command in advance. The pulsation component anticipated in advance is calculated and generated by the pulsation generator 10. An output of the pulsation generator has a waveform shown in (3) of FIG. 18. The waveform shown in (3) is calculated so that an average value thereof is 1. By multiplying this pulsation waveform and the current command I*, the command I0* for I0 is obtained. The ACR 13 calculates the magnitude V1* of the voltage command so that a current waveform of (1) and a command of (4) match. Thereafter, the three-phase voltage commands are calculated with the V1* as amplitude, the inverter is driven by the PWM and the motor 5 is driven by a sinusoidal wave. According to Patent Document 1, for example, the sinusoidal wave driving of the motor is realized without an advanced signal processing such as coordinate conversion or vector operation.

However, in a case where a harmonic wave is included in the induced voltage of the motor, a problem arises. In recent motors, a great amount of fifth-order or seventh-order harmonic wave components tend to be included, and torque pulsation involved is a problem. Influence of the harmonic wave component is described using FIGS. 21A to 21F.

FIGS. 21A to 21F show a current detection phase (21A) in FIG. 22, a detection current I0 (21B), three-phase currents and a fifth-order harmonic wave thereof (21C to 21E) and a detection value (21F) of the fifth-order harmonic wave. FIGS. 21C to 21E are shown in a form of sinusoidal wave purposely to clarify phase-relation between a basic wave and the harmonic waves. If the fifth-order harmonic wave is included in each current waveform, since a phase of the detection current switches every 60 degrees, the waveform shown in FIG. 21F is detected. 60 degrees corresponds to the sixth-order harmonic wave, but a sixth-order component does not exist in the phase current because of symmetric property of the waveform. And therefore, the fifth harmonic wave has no continuity in the phase, and becomes discontinuous at a moment of phase-switching. This is exactly the same for the seventh-order harmonic wave.

Actually, the detection current I0 in a case where distortion is included in the induced voltage of the motor has a waveform as shown in FIG. 22. It can be recognized that the current detection value greatly changes around the phase-switching.

The output of the ACR (current controller) 13 changes more than necessary because of influence of the discontinuity of the harmonic wave, and the harmonic component further increases.

In response to this problem, a method of canceling out the current component caused by distortion by performing correction to the voltage command in the three-phase voltage command operator 14 is proposed in Patent Document 1. In this method, only a voltage waveform set once can be outputted, and response to individual difference of a motor or optimization at variation of a load cannot be realized.

These are the basic operation and problems of Patent Document 1.

In the present embodiment, the correction current generator 18 in FIG. 1 is provided and the problems are solved by adding a new correction current ΔI0 to the current command I0*. Operation of the present embodiment is described using FIGS. 2A to 2D.

FIG. 2A is an original current command I0* corrected by the pulsation generator 10. The correction current ΔI0 as shown in FIG. 2B is added to the command. The ΔI0 has a waveform of saw-tooth-shape having maximum amplitude of Ia and is a function having a period within a phase angle of 60 degrees. And, a sign thereof reverses at an intermediate point so that an average value thereof is zero.

A new current command I0 after addition of the ΔI0 is shown in FIG. 2C. As a result, deviation between the current detection value I0 and the new command I0 becomes very small as shown in FIG. 2D (it is apparent in comparison with FIG. 22). Reduction in deviation means that a current in AC side becomes smooth. That is, by adding the correction current ΔI0 appropriately, influence of the induced voltage distortion is reduced, and therefore, the torque pulsation can be suppressed.

The present embodiment differs from Patent Document 1 in that correction is performed to the current command. In Patent Document 1, correction is performed to three-phase AC voltage commands, but the correction amount changes greatly by a load state and a rotation number. However, in the present embodiment, the current depends only on load torque, and therefore, the configuration according to the present embodiment has an advantage that suppression of the torque pulsation can be realized with respect to a wide speed range and a wide load range by mapping a value of the amplitude Ia of the correction current ΔI0 using the load state as a parameter.

That is, according to the present embodiment, the current in DC side of the inverter 3 driving the synchronous motor 5 is detected, and the pulsation component anticipated to be included in the detection value is superimposed to the current command in advance. And at the same time, another correction current of saw-tooth-shape wave pattern for suppressing the current distortion caused by the induced voltage distortion of the synchronous motor 5 is added to the current command and the magnitude thereof is adjusted. As a result, the driving current is made a current having a smooth sinusoidal wave pattern and the torque pulsation can be suppressed.

Note that, the saw-tooth-shape wave is used as the correction current as shown in FIG. 2B, but other waveforms can be utilized. A periodic function having an average value of zero is preferable to be used to suppress generation of offset.

Second Embodiment

Figure 3:
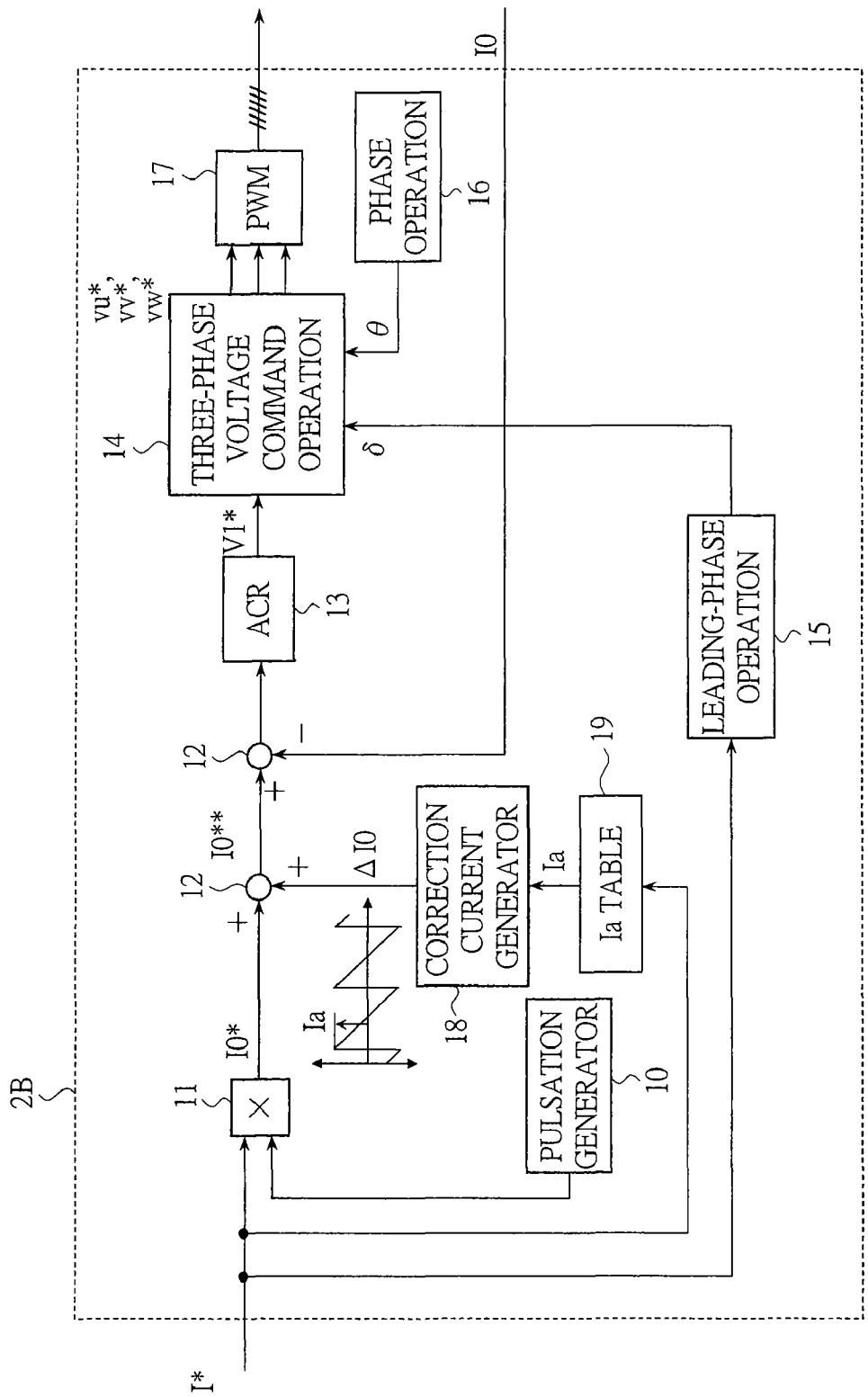
FIG. 3 is a diagram showing a configuration of a controller in a motor drive system according to a second embodiment of the synchronous motor control device of the present invention.

A motor drive system according to a second embodiment of the synchronous motor control device of the present invention is described using FIG. 3.

FIG. 3 shows a controller of the synchronous motor. By using this controller 2B in place of the controller 2 in FIG. 1, the present embodiment is realized.

In FIG. 3, components having symbols of 10 to 18 are the same components as in FIG. 1. The large difference from FIG. 1 is that the amplitude value Ia used in the correction current generator 18 is changed using an Ia table 19. The Ia table 19 functions as a means of obtaining magnitude of the correction signal from magnitude of the current command and setting the magnitude of the correction signal.

In the first embodiment (FIG. 1) described above, a method of setting the Ia is not described in detail, but in the present embodiment, the amplitude Ia of the correction current can be changed according to the current command I*. As a result, an appropriate correction corresponding to a load is realized. For the Ia table 19, data are created in advance according to load torque of the motor. The appropriate value of the Ia with respect to I* is mapped and saved as a data table.

Third Embodiment

A motor drive system according to a third embodiment of the synchronous motor control device of the present invention is described using FIGS. 4A to 9.

FIGS. 4A to 5B show examples of waveforms of distorted induced voltages Eu, Ev and Ew of the motor 5. FIGS. 4A and 4B show an example having a waveform which is pointed in the vicinity of the peak of the induced voltage, and FIGS. 5A and 5B show an example having a waveform which is depressed in the vicinity of the peak, inversely. A phase and amplitude of the correction current are slightly changed accordingly.

An extent of distortion of the induced voltage varies, and individual difference appears because of variation in material. And therefore, a method of obtaining data table in advance is not suitable for mass-produced articles such as a hard disk driver.

And therefore, the present embodiment provides a function for automatically adjusting the correction current.

Figure 6:
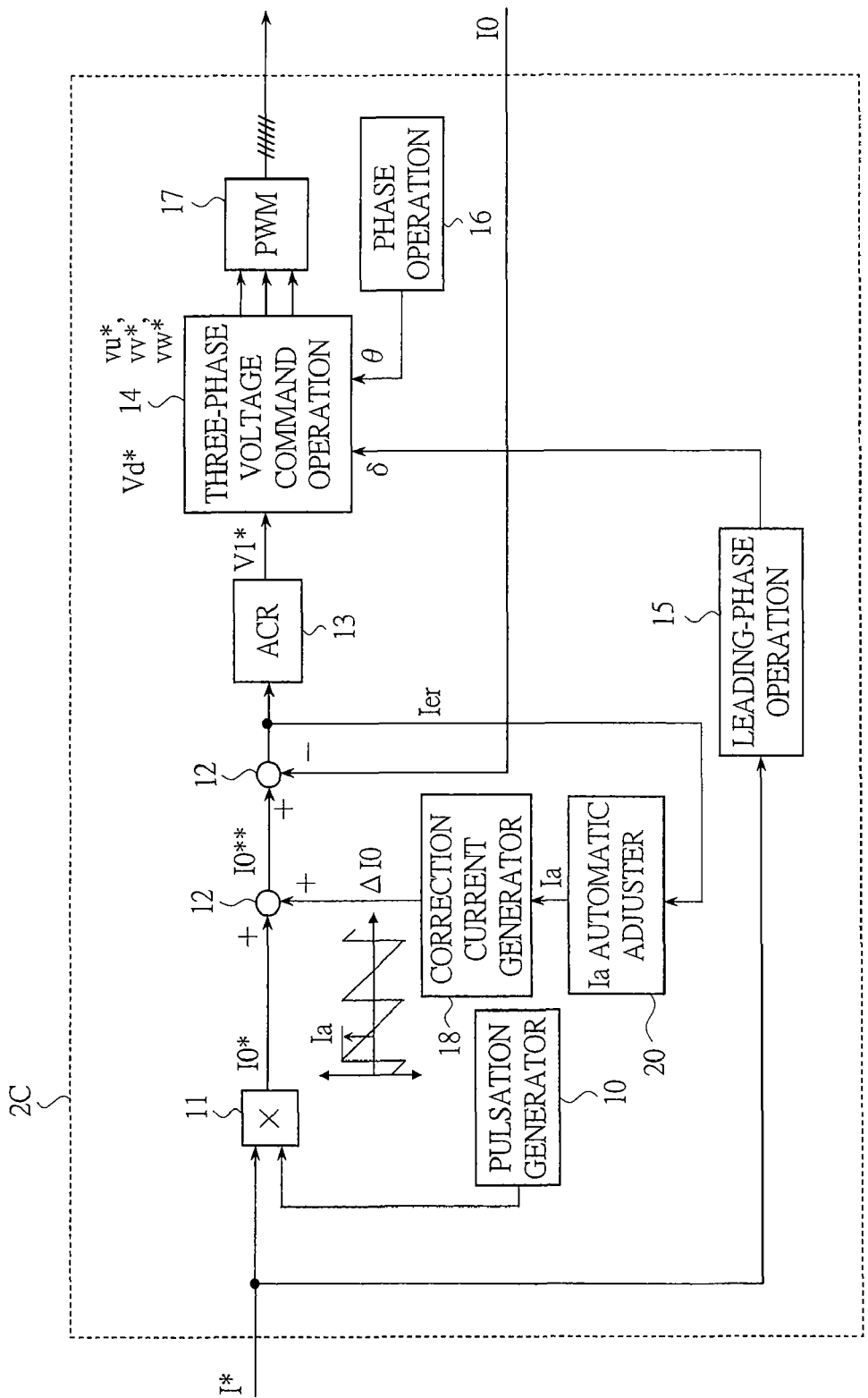
FIG. 6 is a diagram showing a configuration of a controller in the motor drive system according to the third embodiment of the synchronous motor control device of the present invention.

FIG. 6 shows a controller of a synchronous motor. By using this controller 2C in place of the controller 2 of FIG. 1, the present embodiment is realized.

In FIG. 6, components having symbols of 10 to 18 are the same components as in FIG. 1. The large difference from FIG. 1 is that an Ia automatic adjuster 20 automatically adjusting the amplitude value Ia used in the correction current generator 18 is provided. The Ia automatic adjuster 20 functions as a means for automatically adjusting the magnitude of the correction signal based on deviation between the current detection value and the current command.

Figure 7:
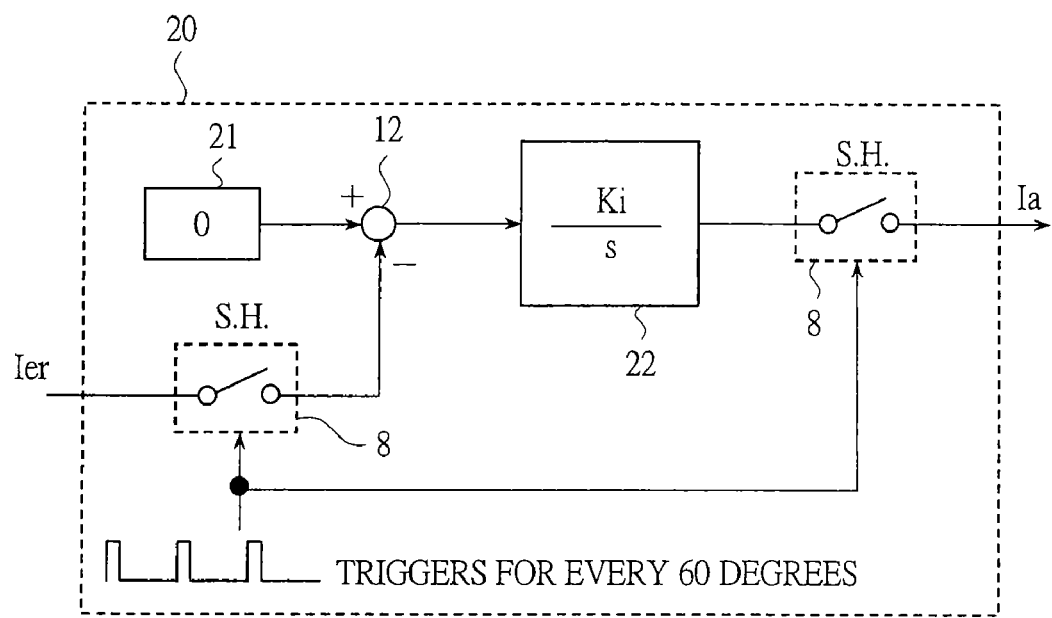
FIG. 7 is a diagram showing a configuration of an Ia automatic adjuster in the motor drive system according to the third embodiment of the synchronous motor control device of the present invention.
Figure 9:
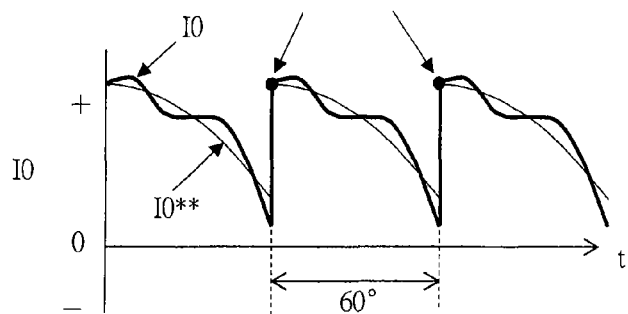
FIG. 9 is a diagram showing an example of waveforms of a current command and a detection current in the motor drive system according to the third embodiment of the synchronous motor control device of the present invention.

Next, operation of the Ia automatic adjuster 20 is described using FIGS. 7 to 9.

In FIG. 7, components having symbols 8 and 12 are the same as in FIG. 1. In addition to the components, a zero generator 21 constantly applying a zero command with respect to an Ier which is deviation between the current command I0 and the detection current I0 and an integral controller 22** are provided.

The operation waveforms of the Ia automatic adjuster 20 are shown in FIGS. 8A to 8E. The deviation Ier between the current command I0 and the detection current I0 is sampled by the sample-holder with trigger signals for every 60 degrees (FIG. 8B). The timing is a value immediately after switching of current detection phase, as shown in FIG. 8B. The sample value is held for a 60 degrees period of the detection phase. In the integral controller 22, the deviation is integrated, and the output thereof is the amplitude Ia of a saw-tooth-shape wave. An output of the integral controller 22 is also sampled by the triggers for every 60 degrees, and outputted from the Ia automatic adjuster 20 as "Ia" (FIG. 8D). As a result, the correction current ΔI0 is a waveform having amplitude changed every 60 degrees (FIG. 8E**).

The Ia continuously changes until the sample value of the Ier becomes zero by the operation of the integral controller 22. And therefore, finally, a waveform of the current detection value becomes a waveform as shown in FIG. 9.

As a result, current variation at phase-switching is eliminated, the driving current becomes a smooth sinusoidal wave, and the torque pulsation is greatly suppressed. And, even if individual difference appears in the induced voltage of the motor, this operation is executed certainly. So, according to the present embodiment, even if the induced voltage distortion of the motor includes different distortion components as shown in FIGS. 4A to 5B, the torque pulsation can be suppressed by one controller. Furthermore, the control processing required is realized by adding only the controller having a simple configuration shown in FIG. 7.

Fourth Embodiment

Figure 10:
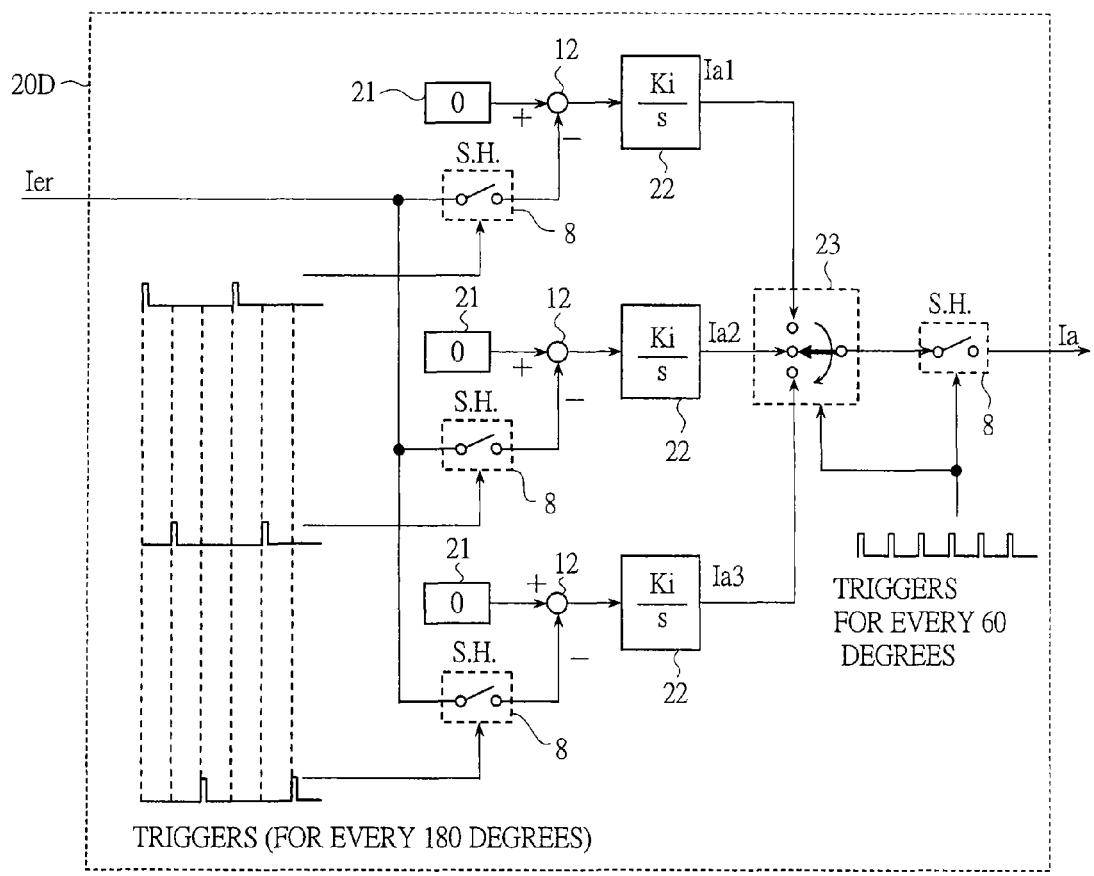
FIG. 10 is a diagram showing a configuration of a controller in a motor drive system according to a fourth embodiment of the synchronous motor control device of the present invention.
Figure 11:
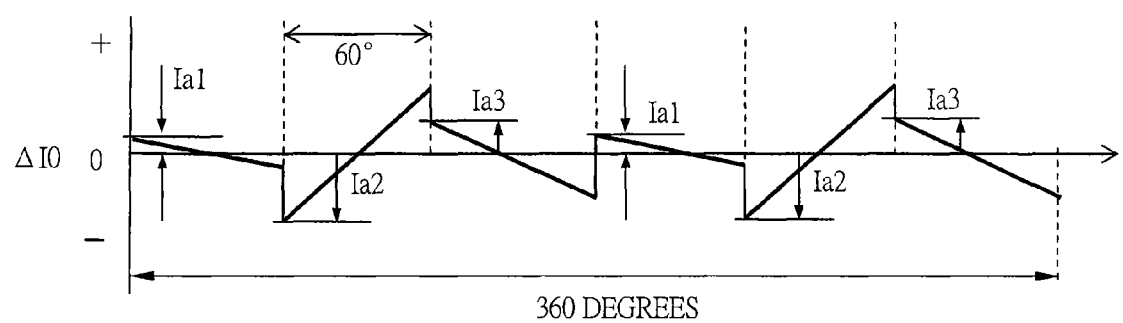
FIG. 11 is a diagram showing an example of waveform of a correction current in the motor drive system according to the fourth embodiment of the synchronous motor control device of the present invention.

Next, a motor drive system according to a fourth embodiment of the synchronous motor control device of the present invention is described using FIGS. 10 and 11.

By the third embodiment described above, a controller always capable of performing optimum distortion suppression to the motors having distortion of an induced voltage different from each other is provided. However, the distortion components described in the third embodiment are only components generated by fifth-order or seventh-order harmonic wave, and the third embodiment is not so effective for components of other orders. It is known that the fifth-order and seventh-order harmonic waves on an AC waveform become a sixth-order component as torque pulsation. And, it is also known that the sixth-order pulsation has a tendency to be generated by some motors. On the other hand, it is known that, in a case where the three phases become unbalanced because of a level of manufacturing precision, a second-order torque pulsation component is generated. The method of the third embodiment has no effect to the second-order pulsation.

And therefore, the present embodiment provides a method for suppressing the second-order pulsation.

FIG. 10 shows an Ia automatic adjuster 20D. By using the Ia automatic adjuster 20D instead of the Ia automatic adjuster 20 of FIG. 7, the present embodiment is realized.

In FIG. 10, components having symbols 8, 12, 21 and 22 are the same as in FIG. 7. The large difference from FIG. 7 is that three integral controllers 22 are provided and a switching switch 23 is newly added. The three integral controllers 22 function as a means of continuously holding three individual values related to the correction signal.

The deviation Ier is sampled by three sample-holders 8, but a timing thereof is switched in order in every 60 degrees. In FIG. 6, a holding state continued for a period of 60 degrees, but in the present embodiment, the holding state continues for a period of 180 degrees. The three integral controllers continue to integrate a deviation so that inputs thereof become zero. The three integral controllers 22 calculate the correction current amplitude of Ia1, Ia2 and Ia3. The three correction current amplitude are switched in every 60 degrees by the switching switch 23 and outputted.

Consequently, the correction current ΔI0 as shown in FIG. 11 is outputted. In the waveform, the amplitude Ia appears for every phase of 180 degrees. That is, with respect to the basic wave period of 360 degrees, correction at a period of ½ can be performed. This means that correction can be realized even for the second-order pulsation component. And therefore, according to the present embodiment shown in FIG. 10, a control device that can suppress second-order pulsation generated by unbalance between phases can be provided.

Fifth Embodiment

Figure 12:
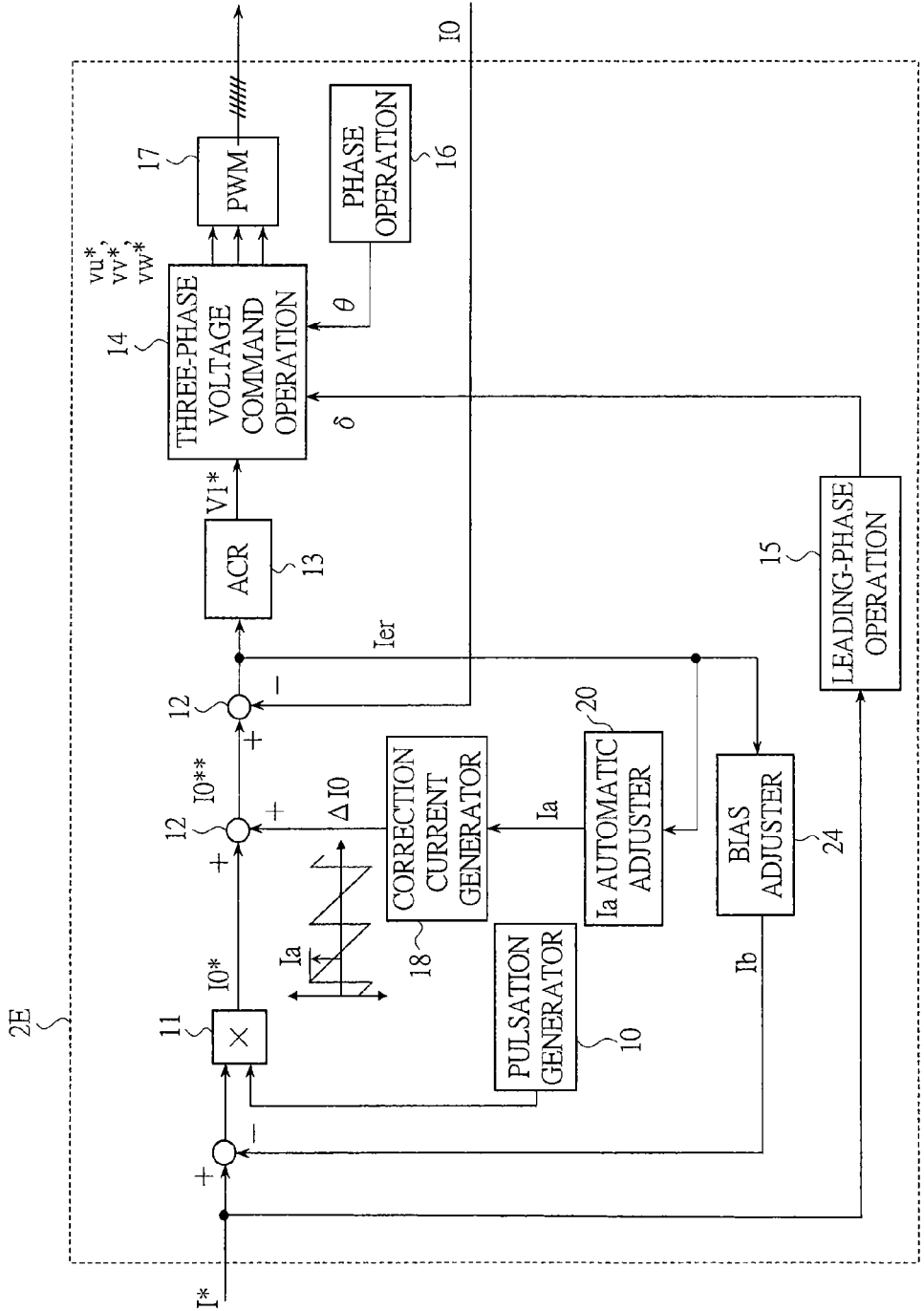
FIG. 12 is a diagram showing a configuration of a controller in a motor drive system according to a fifth embodiment of the synchronous motor control device of the present invention.
Figure 13:
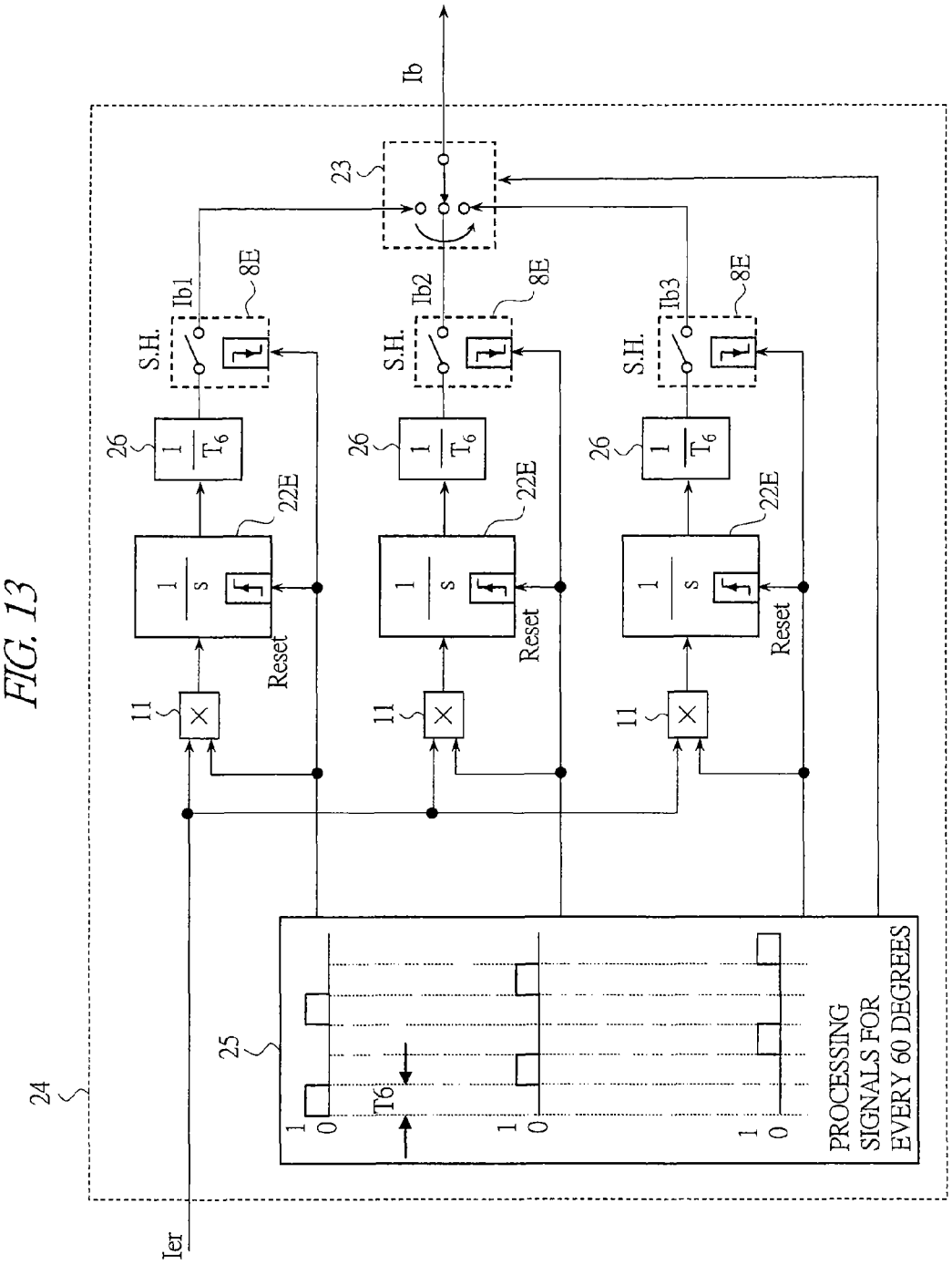
FIG. 13 is a diagram showing a configuration of a vias adjuster in the motor drive system according to the fifth embodiment of the synchronous motor control device of the present invention.
Figure 14:
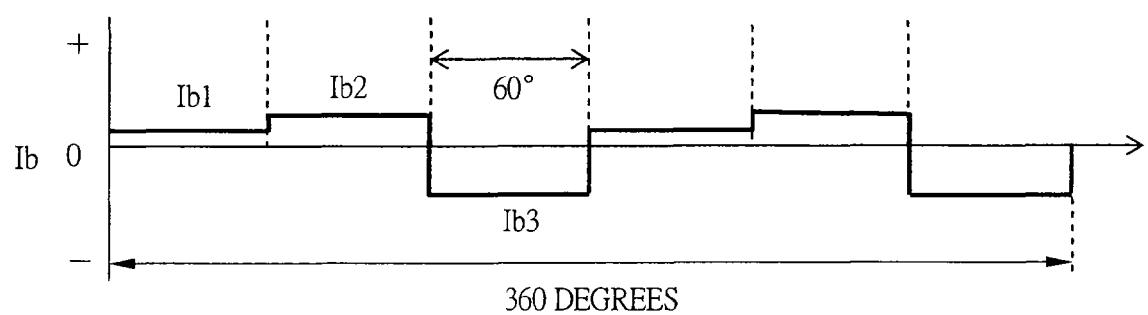
FIG. 14 is a diagram showing a waveform of a bias compensation value in the motor drive system according to the fifth embodiment of the synchronous motor control device of the present invention.

Next, a motor drive system according to a fifth embodiment of the synchronous motor control device of the present invention is described using FIGS. 12 to 14.

The fourth embodiment described above provides the method effective for the second-order torque pulsation. However, in a case where the sixth-order harmonic wave is included in large amounts, in addition to the second-order harmonic wave, it is difficult to suppress both harmonic waves by one controller.

And therefore, the present embodiment provides a technique of obtaining suppression effect simultaneously for the second-order pulsation and the sixth-order pulsation.

FIG. 12 shows a controller 2E of the synchronous motor. By using the controller 2E instead of the controller 2C of FIG. 6, the present embodiment can be realized.

In FIG. 12, a bias adjuster 24 not exist in the controller 2C is newly added, and an Ib outputted therefrom is subtracted from the current command I*. The bias adjuster 24 has a configuration shown in FIG. 13. In FIG. 13, the components having symbols 11 and 23 are completely the same with the components explained above. In FIG. 13, the bias adjuster 24 is newly composed of a sample-holder 8E detecting a falling edge of an external trigger, sampling the signal and holding the same, an integral controller 22E having a function of resetting by the external trigger, a switching signal generator 25 switching an input of the integral controller 22E and a proportional gain 26 having a gain value which is an inverse number of a time corresponding to an electrical angle of 60 degrees.

The present embodiment has a function of calculating an average value of an outputted current for every 60 degrees period, differently from the Ia automatic adjuster in FIG. 10. In the switching signal generator 25 of FIG. 13, processing signals for every 60 degrees are generated and by multiplying "1" or "0" to the outputs of the integral controllers 22E, one of the outputs is selected, at the same time as generating the triggers for the three integral controllers 22E and the sample-holders 8E.

As a result, as shown in FIG. 14, a bias value of deviation having a half period with respect to 360 degrees is calculated, similarly to the fourth embodiment. By taking the bias value into control in advance, a torque pulsation component of a second stage can be suppressed. Furthermore, in the present embodiment, an Ia automatic adjuster that can suppress pulsation for every 60 degrees can be used in combination, and therefore, a large effect can be obtained even in a case where the second-order and the sixth-order harmonic waves exist simultaneously.

Sixth Embodiment

Next, a motor drive system according to a sixth embodiment of the synchronous motor control device according to the present invention is described using FIG. 15.

FIG. 15 shows a motor drive system in the same manner as the first embodiment (FIG. 1). In FIG. 15, the components having symbols 1, 2, 4, 5, 7 to 15, 17 and 18 are the same components as in FIG. 1. The large difference from FIG. 1 is that a current phase detector 27 is provided in the inverter main circuit unit 6F of the inverter 3F. The current phase detector 27 functions as a means of detecting a current phase of the synchronous motor 5. And, a phase operator 16F to be described below functions as a means of correcting an output voltage phase of the inverter based on the current phase and driving the synchronous motor.

Next, operation of a characteristic portion of the motor drive system in FIG. 15 is described. In the current phase detector 27, phase information of a current flowing to the motor 5 is detected from a terminal voltage of the switching element. Specifically, a zero crossing point of each phase current is detected, and the phase information of the current is provided to the controller 2F.

The phase information of the current is provided to the phase operator 16F in the controller 2F, and a rotor position phase of the motor 5 is estimated and calculated. Thus, position-sensor-less motor driving using no rotor position sensor (a hall IC, a pulse encoder and the like) of the motor 5 is realized. In this case, as for a method of suppressing the torque pulsation, the methods described in the above embodiments can be used as it is.

Seventh Embodiment

Figure 16:
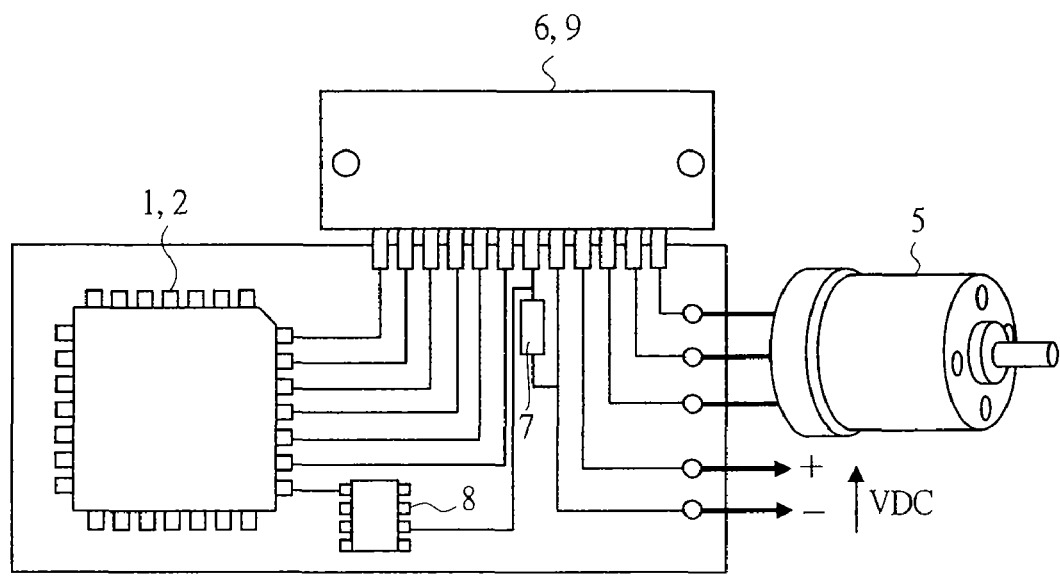
FIG. 16 is a diagram showing a configuration of a motor drive system according to a seventh embodiment of the synchronous motor control device of the present invention.

Next, a motor drive system according to a seventh embodiment of the synchronous motor control device of the present invention is described using FIG. 16.

FIG. 16 is an actual diagram showing the drive system of the synchronous motor. In FIG. 16, the I* generator 1 and the controller 2 are realized by one integrated circuit, and the inverter is driven by a PWM pulse waveform outputted therefrom. As for the inverter, the inverter main circuit unit 6 and the output pre-driver 9 are integrated (one package), as a result, miniaturization is achieved. The inverter current is detected by the single-shunt current detector 7, and is sampled and held by the sample-holder. Then, the controller read the current. By having the inverter main circuit unit 6 and the output pre-driver 9 as separate circuits as shown in FIG. 16, driving of a motor having large capacity can be realized.

And, by making a portion of the controller as a general-purpose LSI, this method can be applied to various applications (capacities).

Eighth Embodiment

Figure 17:
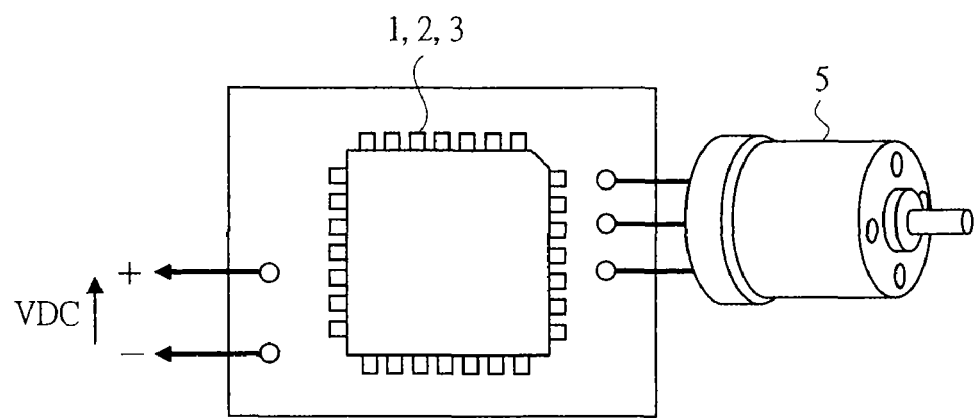
FIG. 17 is a diagram showing a configuration of a motor drive system according to an eighth embodiment of the synchronous motor control device of the present invention.

Next, a motor drive system according to an eighth embodiment of the synchronous motor control device of the present invention is described using FIG. 17.

In FIG. 17, the I* generator 1, the controller 2 and the inverter 3 are configured as one chip. In the present embodiment, variable-speed driving of the motor 5 is realized by connecting the motor 5 and the power source. In a case of driving a small motor, the configuration has an advantage that an entire system can be miniaturized.

And, in a case where the control portion is configured with an integrated circuit, high speed operation performed in several to several tens of microseconds or shorter can be realized. In the present embodiment, no complex operation is required, and therefore, reduction of the torque pulsation can be realized without greatly increasing the number of gates. If a microcomputer or a DSP is used for the control, speed-up of the operation is difficult. But by making the control unit as a dedicated integrated circuit, such a problem is significantly improved, and therefore, the effect of the present embodiment is increased.

In the foregoing, the invention made by the inventors of the present invention has been concretely described based on the embodiments. However, it is needless to say that the present invention is not limited to the foregoing embodiments and various modifications and alterations can be made within the scope of the present invention.

For example, all the embodiments described above can be applied regardless of presence (with sensor or sensor-less) of the rotation position sensor of the synchronous motor.

The motor drive system of each embodiment described above can improve Wow and Flutter of a hard disk or an optical disk by suppressing torque pulsation and rotation pulsation with a simplest possible configuration, and therefore, lower noise and higher recording density can be realized.

The control technique of a synchronous motor according to the present invention relates to a motor driving device and a motor driving integrated circuit device and can be applied to rotation control technique of a spindle motor such as a HDD, an optical disk driver and the like.

What is claimed is:

1. A synchronous motor control device comprising:
    a synchronous motor;
    an inverter applying a pulse-width-modulated voltage to the synchronous motor and driving the synchronous motor with a sinusoidal alternating current;
    a power source supplying power to the inverter;
    a current detector detecting a current supplied to the inverter;
    a current command generator generating a current command for the synchronous motor; and
    a controller adjusting a voltage outputted by the inverter based on a current detection value from the current detector and the current command from the current command generator,
    wherein a means of superimposing a pulsation component anticipated in advance to the current command is provided,
    wherein a means of superimposing a correction signal substantially having an average value of zero to the current command is provided,
    wherein a means of obtaining magnitude of the correction signal from a magnitude of the current command and setting the magnitude of the correction signal is provided,
    wherein the correction signal is a periodic function changing at a frequency of six times with respect to an electrical angle driving frequency of the synchronous motor.

2. The synchronous motor control device according to claim 1, further comprising:
    a means of automatically adjusting magnitude of the correction signal based on deviation between the current detection value and the current command.

3. The synchronous motor control device according to claim 2,
    wherein the magnitude of the correction signal has a value updated every 60 degrees with respect to an electrical angle phase of the synchronous motor and is adjusted.

4. The synchronous motor control device according to claim 2,
    wherein the magnitude of the correction signal has a value updated every 60 degrees with respect to an electrical angle phase of the synchronous motor, and
    wherein a means of continuously holding three individual values related to the correction signal is provided, the magnitude of the correction signal is calculated with respect to each of the three individual values in order and an amount of correction is reflected to the current command in order.

5. The synchronous motor control device according to claim 1, further comprising:
    a means of detecting a current phase of the synchronous motor; and
    a means of correcting an output voltage phase of the inverter based on the current phase and driving the synchronous motor.

6. The synchronous motor control device according to claim 1,
    wherein the current command generator and the controller are configured using an integrated circuit device.

7. The synchronous motor control device according to claim 1,
    wherein the inverter, the current detector, the current command generator and the controller are formed on a same semiconductor substrate.

* * * * *